Sept. 29, 1964 E. M. CREAMER, JR., ETAL 3,151,216
STEREOPHONIC SOUND REPRODUCING APPARATUS FOR DEMODULATING AN FM STEREO MULTIPLEXED SIGNAL OR AMPLIFYING A SIGNAL FROM A PHONOGRAPH PICKUP
Filed June 15, 1962
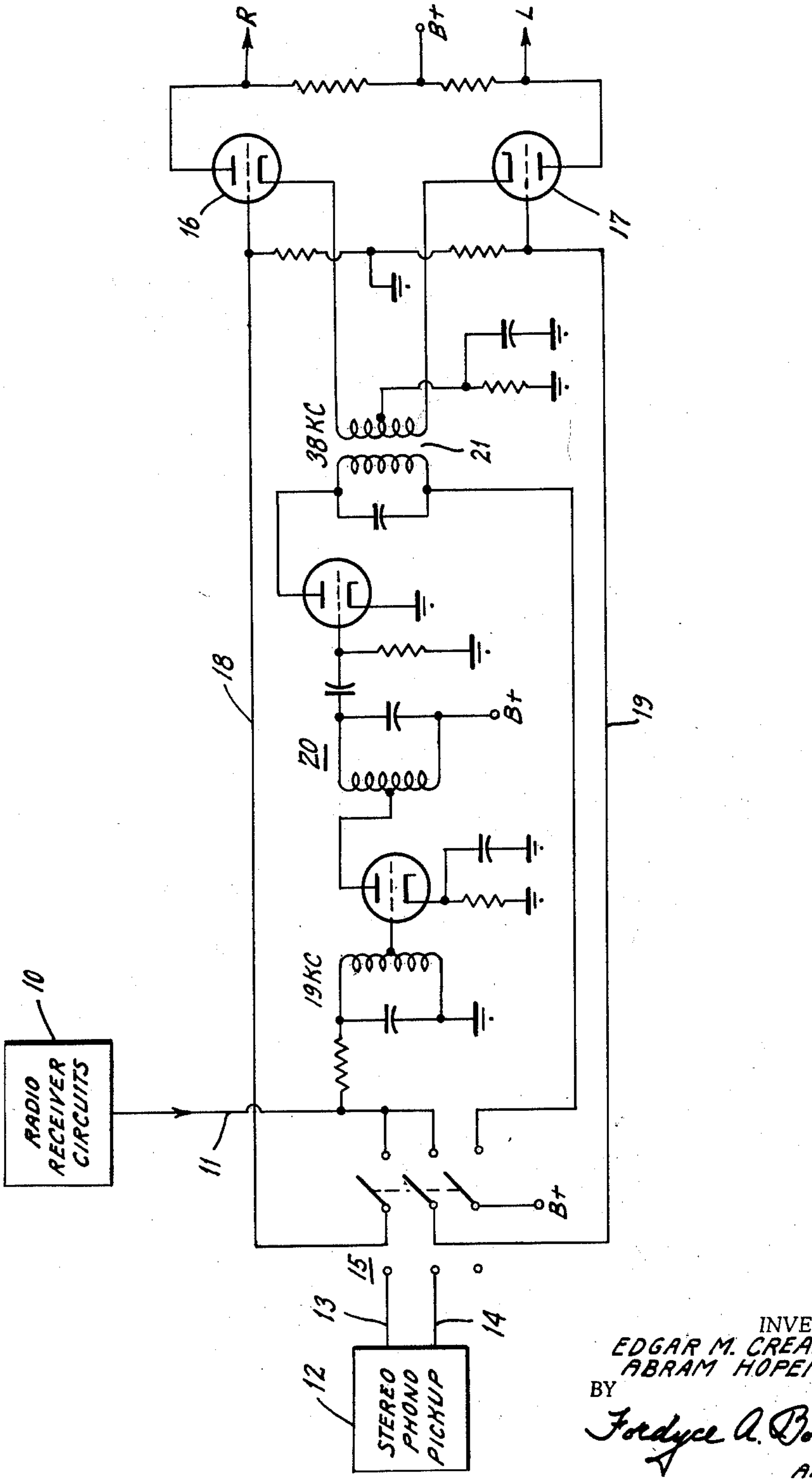
INVENTORS
EDGAR M. CREAMER, JR.
ABRAM HOPENGARTEN
BY
Fordyce A. Bothwell
ATTORNEY United States Patent Office 3,151,216
Patented Sept. 29, 1964

3,151,216

STEREOPHONIC SOUND REPRODUCING APPARATUS FOR DEMODULATING AN FM STEREO MULTIPLEXED SIGNAL OR AMPLIFYING A SIGNAL FROM A PHONOGRAPH PICKUP

Edgar M. Creamer, Jr., Melrose Park, and Abram Hopengarten, Lafayette Hills, Pa., assignors to Philco Corporation, Philadelphia, Pa., a corporation of Delaware Filed June 15, 1962, Ser. No. 202,755
13 Claims. (Cl. 179—15)

This invention relates to stereophonic sound reproduction and more particularly to stereophonic radio-phonograph combinations. The invention is particularly applicable to stereophonic radio-phonograph combinations which are designed to receive the now-standard FM multiplex signal, and it will be described with reference to such application.

As is now well known, the standard FM multiplex signal comprises a composite signal which is transmitted on an FM carrier, and which includes stereophonic sound signal components and a 19 kc. pilot carrier or phase reference signal. At the receiver the composite signal is recovered from the FM carrier and it may be demodulated by supplying it to a switching type demodulation circuit to which 38 kc. switching voltages are also supplied. The latter may be derived in response to the 19 kc. pilot carrier, e.g., by means of an amplifier-doubler circuit.

In a stereophonic radio-phonograph combination, during phonograph operation it is necessary of course to amplify the stereophonic signals supplied by the phonograph pickup. This audio amplifying function and the demodulation of the composite signal during radio reception are, of course, distinctly different functions. In the past these two functions have been performed by separate components of the radio-phonograph apparatus.

One object of the present invention is to effect economy in such apparatus.

A more specific object of the invention is to provide, in such apparatus, an arrangement by which both of the above-mentioned functions are performed by the same components.

In accordance with the preferred embodiment of this invention, provision is made for demodulating the composite signal during radio reception by means of two grid-controlled tubes (or tube sections), and further provision is made for utilizing the same tubes as preamplifiers during phonograph operation. During radio reception the composite signal is supplied to the control grid of said tubes, and 38 kc. switching voltages of opposite polarity are produced in a switching circuit in response to the 19 kc. pilot carrier and are supplied respectively to the cathodes of said tubes. During phonograph operation the switching circuit is rendered inoperative and the stereophonic signals from the phonograph pickup are supplied respectively to the control grids of said tubes which then function as preamplifiers.

The invention may be fully understood from the following detailed description with reference to the accompanying drawing wherein the single figure is a simplified schematic illustration of a portion of a stereophonic radio-phonograph combination embodying the present invention.

Referring more particularly to the drawing, block 10 represents conventional receiver circuits which receive the FM carrier-transmitted signal and recover from the FM carrier the aforementioned composite signal, the latter appearing at output connection 11. Block 12 represents a conventional stereophonic phonograph pickup which supplies stereophonic signals at its output connections 13 and 14. A selector switch 15 enables selective operation of either the radio receiver or the phonograph. The conductors 11, 13 and 14 are connected to terminals of switch 15 as shown.

In accordance with the present invention, tubes 16 and 17 are made to serve either as demodulators for the composite signal supplied by circuits 10 or as preamplifiers for the signals supplied by the phonograph pickup 12. The control grids of these tubes are connected over conductors 18 and 19 to switch 15 so that when the switch is in the right-hand position the composite signal is supplied to said grids, and when the switch is in the left-hand position the stereophonic signals from pickup 12 are supplied respectively to said grids. The outputs of tubes 16 and 17 are the two stereophonic signals R and L which are amplified and reproduced in the usual way.

During radio reception the switching action of tubes 16 and 17 is effected through the switching circuit 20 wherein the 19 kc. pilot carrier is derived from the composite signal and is utilized to produce the 38 kc. switching voltages. The switching circuit shown in one of the known forms in which the 19 kc. pilot carrier is derived, amplified and doubled in frequency to produce 38 kc. switching voltages at the center-tapped secondary of transformer 21. In accordance with this invention the extremities of said secondary are connected respectively to the cathodes of tubes 16 and 17. The switching circuit is rendered operative only during radio reception by virtue of the fact that the B+ supply connection to the primary of transformer 21 is through contacts of switch 15 which are closed only during radio reception.

While the secondary of the transformer 21 is in circuit with the cathodes of tubes 16 and 17 during phonograph operation, this does not deleteriously affect the operation which is then at audio frequencies well below 38 kc.

From the foregoing description will be seen that this invention simplifies and reduces the cost of stereophonic radio-phonograph apparatus by utilizing a pair of electronic translating devices for the performance of two unrelated and distinct functions. In the illustration two tubes are shown, but of course they could be the sections of a twin triode. Therefore the terms "translating devices" and "tubes" as used in the claims are intended to mean either individual devices or sections of a dual structure.

While in the illustrated embodiment a manual selector switch is utilized, the selecting operation cold be performed automatically. For example, a selecting relay could be employed normally in the position for phonograph operation but operable in response to a component of the composite signal from the receiver circuits 10 such as the 19 kc. pilot carrier.

It should be noted further that the dual function feature of the present invention may be used in radio-phonograph apparatus in which the radio apparatus is capable of receiving AM and/or non-stereo FM as well as stereo FM. In such case tubes 16 and 17 can be used additionally for amplification of the signals derived from demodulation of the transmitted AM and non-stereo FM signals.

While a preferred embodiment of the invention has been illustrated and described, it will be understood that the invention is not limited thereto but contemplates such modifications and further embodiments as may occur to those skilled in the art.

We claim:

1. Stereophonic sound reproducing apparatus comprising: stereophonic receiver circuits which supply a composite signal that requires demodulation to derive the stereophonic signals, a stereophonic phonograph pickup which supplies two separate stereophonic signals, a dual channel including a pair of electronic translating devices, and means for effecting operation of said devices either as demodulators for the composite signal supplied by said receiver circuits or as amplifiers for the separate signals supplied by said pickup.

2. Stereophonic sound reproducing apparatus comprising: stereophonic receiver circuits which supply a composite signal that requires demodulation to derive the stereophonic signals, a stereophonic phonograph pickup which supplies two separate stereophonic signals, a dual channel including a pair of electron tubes, and means for effecting operation of said tubes either as demodulators for the composite signal supplied by said receiver circuits or as amplifiers for the separate signals supplied by said pickup.

3. Stereophonic sound reproducing apparatus comprising: stereophonic receiver circuits which supply a composite signal that requires demodulation to derive the stereophonic signals, a stereophonic phonograph pickup which supplies two separate stereophonic singals, a dual channel including a pair of electronic translating devices capable of being utilized either for said demodulation or for amplification of the separate signals supplied by said pickup, and selector switch means for supplying to said devices either said composite signal or the signals from said pickup.

4. Stereophonic sound reproducing apparatus comprising: stereophonic receiver circuits which supply a composite signal including stereophonic sound signal components to be detected and a phase reference signal to be utilized in the detection of said components, a stereophonic phonograph pickup which supplies two separate stereophonic signals, a dual channel including a pair of electronic translating devices capable of being utilized either for detection of said components or for amplification of the separate signals supplied by said pickup, means for supplying said composite signal simultaneously to both of said devices for detection, means for deriving and utilizing said phase reference signal to effect said detection, and means for supplying the two separate signals from said pickup respectively to said devices for amplification.

5. Stereophonic sound reproducing apparatus comprising: stereophonic receiver circuits which supply a composite signal including stereophonic sound signal components to be detected and a phase reference signal to be utilized in the detection of said components, a stereophonic phonograph pickup which supplies two separate stereophonic signals, a dual channel including a pair of electron tubes capable of being utilized either for detection of said components or for amplification of the separate signals supplied by said pickup, means for supplying said composite signal simultaneously to both of said tubes for detection, means for deriving and utilizing said phase reference signal to effect said detection, and means for supplying the two separate signals from said pickup respectively to said tubes for amplification.

6. Stereophonic sound reproducing apparatus comprising: stereophonic receiver circuits which supply a composite signal including stereophonic sound signal components to be detected and a phase reference signal to be utilized in the detection of said components, a stereophonic phonograph pickup which supplies two separate stereophonic signals, a dual channel including a pair of electronic translating devices capable of being utilized either for detection of said components or for amplification of the separate signals supplied by said pickup, selector switch means for supplyling to said devices either said composite signal or the signals from said pickup, and means for deriving and utilizing said phase reference signal to effect detection by said devices when said composite signal is supplied thereto.

7. Stereophonic sound reproducing apparatus comprising: stereophonic receiver circuits which supply a composite signal including stereophonic sound signal components to be detected and a phase reference signal to be utilized in the detection of said components; a stereophonic phonograph pickup which supplies two separate stereophonic signals; a dual channel including a pair of electron tubes each having a cathode, a control grid and an anode; means for supplying said composite signal simultaneously to the control grids of said tubes; means responsive to said phase reference signal for supplying switching voltages of opposite phase to the cathodes of said tubes to effect detection of said components; means for deriving the detected signal components from the anodes of said tubes; and means for supplying the two separate signals from said pickup respectively to the control grids of said tubes for amplification.

8. Stereophonic sound reproducing apparatus comprising: stereophonic receiver circuits which supply a composite signal including stereophonic sound signal components to be detected and a phase reference signal to be utilized in the detection of said components; a stereophonic phonograph pickup which supplies two separate stereophonic signals; a dual channel including a pair of electron tubes each having a cathode, a control grid and an anode; means for supplying said composite signal simultaneously to the control grids of said tubes; a circuit for supplying switching voltages to said tubes, said circuit including a transformer having a center-tapped secondary winding; means connecting the opposite ends of said winding respectively to the cathodes of said tubes; means for supplying said phase reference signal to said circuit; means for deriving the detected signal components from the anodes of said tubes; and means for supplying the two separate signals from said pickup respectively to the control grids of said tubes for amplification.

9. Stereophonic sound reproducing apparatus comprising: stereophonic receiver circuits which supply a composite signal including stereophonic sound signal components to be detected and a phase reference signal to be utilized in the detection of said components; a stereophonic phonograph pickup which supplies two separate stereophonic signals; a dual channel including a pair of electron tubes each having a cathode, a control grid and an anode; selector switch means for supplying to the control grids of said tubes either said composite signal equally to said two control grids or the signals from said pickup separately to the respective control grids; and means responsive to said phase reference signal for supplying switching voltages of opposite phase to the cathodes of said tubes to effect detection of said components when said composite signal is supplied to said grids.

10. Stereophonic sound reproducing apparatus comprising: stereophonic receiver circuits for recovering from an FM carrier a composite signal which includes stereophonic sound signal components to be detected and a phase reference signal to be utilized in the detection of said components; a stereophonic phonograph pickup having two output connections at which are supplied two separate stereophonic signals; a dual channel including a pair of electronic translating devices capable of being utilized either for detection of said components or for amplification of the separate signals supplied by said pickup; a circuit operable in response to said phase reference signal to supply switching voltage to said devices for detection of said components; selector switch means; connections controlled by said switch means for supplying to said devices either said composite signal or said two signals supplied by said pickup; and a connection controlled by said switch means for rendering said circuit operative only when said composite signal is supplied to said devices.

11. Stereophonic sound reproducing apparatus comprising: stereophonic receiver circuits for recovering from an FM carrier a composite signal which includes stereophonic sound signal components to be detected and a phase reference signal to be utilized in the detection of said components; a sterephonic phonograph pickup having two output connections at which are supplied two separate stereophonic signals; a dual channel including a pair of electronic translating devices capable of being utilized either for detection of said components or for amplification of the separate signals supplied by said pickup; a circuit connected to said receiver circuits and operable in response to said phase reference signal to supply switching voltages to said devices for detection of said components; selector switch means; connections controlled by said switch means for supplying to said devices either said composite signal or said two signals supplied by said pickup; and a voltage supply connection for said circuit controlled by said switch means so as to render said circuit operative only when said composite signal is supplied to said devices.

12. Stereophonic sound reproducing apparatus comprising: stereophonic receiver circuits for recovering from an FM carrier a composite signal which includes stereophonic sound signal components to be detected and a phase reference signal to be utilized in the detection of said components; a sterephonic phonograph pickup having two output connections at which are supplied two separate stereophonic signals; a dual channel including a pair of vacuum tubes each having a cathode, a control grid and an anode and capable of being utilized either for detection of said components or for amplification of the separate signals supplied by said pickup; a circuit operable in response to said phase reference signal to supply switching voltages in opposite phase to the cathodes of said vacuum tubes for detection of said components; selector switch means; connections controlled by said switch means for supplying either said composite signal equally to said two control grids or said two signals supplied by said pickup separately to the respective control grids; and a connection controlled by said switch means for rendering said circuit operative only when said composite signal is supplied to said control grids.

13. Stereophonic sound reproducing apparatus comprising: stereophonic receiver circuits for recovering from an FM carrier a composite signal which includes stereophonic sound signal components to be detected and a phase reference signal to be utilized in the detection of said components; a stereophonic phonograph pickup having two output connections at which are supplied two separate stereophonic signals; a dual channel including a pair of vacuum tubes each having a cathode, an anode and a control grid and capable of being utilized either for detection of said components or for amplification of the separate signals supplied by said pickup; a transformer having a primary winding and a center tapped secondary winding, the end terminals of said secondary winding being connected to the respective cathodes; bias means connected between the center tap of said secondary winding and a point of reference potential; a circuit operable in response to said phase reference signal to supply switching voltages to said primary winding; selector switch means; connections controlled by said switch means for supplying either said composite signal equally to said control grids or said two signals supplied by said pickup separately to the respective control grids; and a connection controlled by said switch means for rendering said circuit operative only when said composite signal is supplied to said control grids.

References Cited in the file of this patent

UNITED STATES PATENTS

| | | |
|---|---|---|
| 2,950,356 | Stott | Aug. 23, 1960 |
| 3,018,335 | De Rosa | Jan. 23, 1962 |

OTHER REFERENCES

Eilars: "FM-Stereo: Time Division Approach," Audio (pp. 20–22 and 96 relied on).